(12) United States Patent
Marentette et al.

(10) Patent No.: US 6,902,778 B2
(45) Date of Patent: Jun. 7, 2005

(54) HIGH STIFFNESS PLASTIC WALL FOR MOLDED PLASTIC PRODUCTS

(75) Inventors: John Francis Marentette, Tecumseh (CA); David Marion, Belle River (CA); Jason Pettipiece, Chatham (CA); Jianrui Ye, Tilbury (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/413,122

(22) Filed: Apr. 14, 2003

(65) Prior Publication Data

US 2004/0001939 A1 Jan. 1, 2004

Related U.S. Application Data

(60) Provisional application No. 60/392,149, filed on Jun. 28, 2002.

(51) Int. Cl.[7] .............................. B32B 1/00; F02M 35/10
(52) U.S. Cl. ...................... 428/17; 428/116; 428/188; 60/39.183; 123/184.21; 123/539
(58) Field of Search ................................. 428/116, 178, 428/77, 78, 188; 52/793.1; 60/39.183, 39.12, 596; 123/184.21, 432, 537, 539, 585; 296/191, 192

(56) References Cited

U.S. PATENT DOCUMENTS 3,509,005 A    4/1970   Hartig ........................ 161/69
3,589,972 A  * 6/1971   Greig et al. ................. 428/116
3,664,906 A  * 5/1972   Hartig ......................... 428/116
3,741,857 A    6/1973   Kakutani et al. ........... 161/127
3,935,357 A  * 1/1976   Padovani .................... 428/166
4,172,479 A    10/1979  Lindgren ............... 156/244.13
5,182,158 A  * 1/1993   Schaeffer ..................... 428/178
5,487,930 A  * 1/1996   Lockshaw et al. ............ 428/53
5,736,221 A  * 4/1998   Hardigg et al. .............. 428/116

FOREIGN PATENT DOCUMENTS

| BE | 1012382    | 10/2000 |            |
|----|------------|---------|------------|
| DE | 1209725    | 1/1966  |            |
| DE | 3107838    | 2/1981  | B29D/3/02  |
| EP | 0754540    | 1/1997  | B29D/22/00 |
| EP | 1245478    | 2/2002  | B62D/29/04 |
| FR | 282132     | 2/2003  | B32B/3/12  |
| JP | 06179448   | 6/1994  | B65D/19/32 |
| JP | 06278660   | 10/1995 |            |
| WO | WO 03 022664 | 3/2003 | B62D/29/04 |

OTHER PUBLICATIONS

European Search Report (EP 03 01 1821) Mailed Feb. 19, 2004.

* cited by examiner

Primary Examiner—Donald J. Loney

(57) ABSTRACT

Plastic parts are formed to have a relatively high wall stiffness by utilizing a pair of spaced plastic plates. One of the plates may be a simple plate. The other plate has a plurality of ribs extending from a base. The ribs are welded to the other plate. Use of the ribs provides a relatively high degree of stiffness to the final molded plastic part, for a relatively lightweight part.

10 Claims, 2 Drawing Sheets

PANEL DESIGNS FOR ANALYSIS

RE: NVH MODAL WR # 2002-10117 - NM.

| PANEL # | THICKNESS LOWER $t_l$ | THICKNESS RIB $t_r$ | HEIGHT RIB $h_r$ | THICKNESS UPPER $t_u$ | DESCRIPTION |
|---|---|---|---|---|---|
| 1 | 3 | | | | SIMPLE PLATE 3mm THICK |
| 2 | 4 | | | | SIMPLE PLATE 4mm THICK |
| 3 | 6 | | | | SIMPLE PLATE 6mm THICK |
| 4 | 8 | | | | SIMPLE PLATE 8mm THICK |
| 5 | 3 | 2 | 6 | | RIBBED PLATE |
| 6 | 4 | 3 | 10 | | RIBBED PLATE |
| 7 | 6 | 4 | 15 | | RIBBED PLATE |
| 8 | 8 | 4 | 15 | | DOUBLED PLATE |
| 9 | 3 | 2 | 6 | 2 | DOUBLED PLATE |
| 10 | 4 | 3 | 10 | 2 | DOUBLED PLATE |
| 11 | 6 | 4 | 15 | 3 | |
| 12 | | | | | |

ALL PLATES TO BE 160mm x 160mm

Fig-3B

HIGH STIFFNESS PLASTIC WALL FOR MOLDED PLASTIC PRODUCTS

CROSS REFERENCE TO RELATED APPLICATIONS

This application claims priority to U.S. Provisional Patent Application Ser. No. 60/392,149 filed on Jun. 28, 2002.

BACKGROUND OF THE INVENTION

This invention relates to the provision of a stiff molded plastic wall formed by utilizing two spaced plastic plates, wherein at least one of the plates is ribbed and welded to the other.

Plastics are becoming utilized for more and more parts. As known, plastic parts are typically molded in a plastic mold. While the use of plastics to form parts does have a number of benefits, it would still be desirable to increase certain design features. As an example, in many applications the weight of the final molded part would be desirably reduced. In particular, in automotive applications, reduction of the weight of the final part is a design goal. However, merely limiting the amount of plastic in the final part will also result in the walls of the part being less stiff than may be desirable.

Many automotive parts may be subjected to extreme temperature and other challenges. Air induction or air intake manifold components are particularly challenged in this regard. A minimum stiffness is required that can resist these challenges.

It would be desirable to provide a way of forming a molded plastic part such that the plastic part has an acceptable wall stiffness with a reduced wall weight.

SUMMARY OF THE INVENTION

In the disclosed embodiment of this invention, a molded plastic part is formed of two spaced plates. The two spaced plates are welded together at a plurality of ribs formed on one of the two plates. That is, one of the two plastic plates is molded to have ribs extending away from a base. These ribs are welded to a base on the other plate.

Most preferably, the ribs are formed into a cross or honeycomb shape. The resultant plastic part has much stiffer walls than a plastic part having a single solid wall formed of the equivalent weight.

In a preferred embodiment, the height of the rib is greater than the thickness of the base from which the rib extends, and is further greater than the thickness of the rib. In particular, the thickness of the base is less than half the height of the rib. Further, the thickness of the rib is preferably less than one-third the height of the rib. That is, the rib extends for a relatively great height when compared to the thickness of its base, or the thickness of the rib.

The resultant final molded part has greater stiffness when compared to the prior art for an equivalent weight part.

These and other features of the present invention can be best understood from the following specification and drawings, the following of which is a brief description.

BRIEF DESCRIPTION OF THE DRAWINGS

FIG. 3B shows a number of example dimensions.

DETAILED DESCRIPTION OF THE PREFERRED EMBODIMENT

Figure 1:
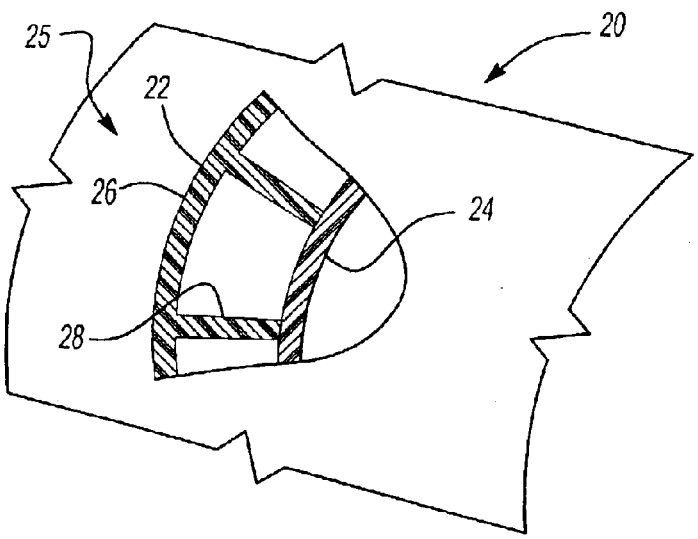
FIG. 1 is a schematic view of an air manifold molded from the present invention.

FIG. 1 shows a plastic molded part 20 which is illustrated as an air intake manifold. It should be understood that the present invention does provide a method and final plastic part that can be utilized for many other applications. As shown, a first plate 22 is welded to a second plate 24 to form a wall 25 for the part 20. Notably, as can be seen, the wall may be somewhat curved, or have a contour as is desired for the final part. That is, "plate" should not be interpreted to be planar.

A base 26 for the plate 22 has ribs 28 extending away and toward the plate 24.

Figure 2:
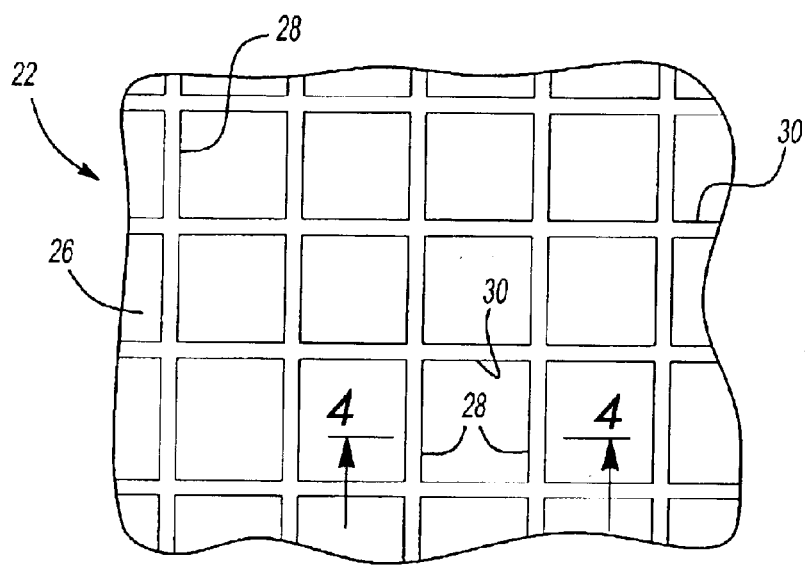
FIG. 2 shows a first plate according to the present invention.

As shown in FIG. 2, the plate 22 has ribs 28 and 30 that cross to form a honeycomb shape. As can be appreciated, ribs can be easily molded with the base 26 as a single part.

Figure 3A:
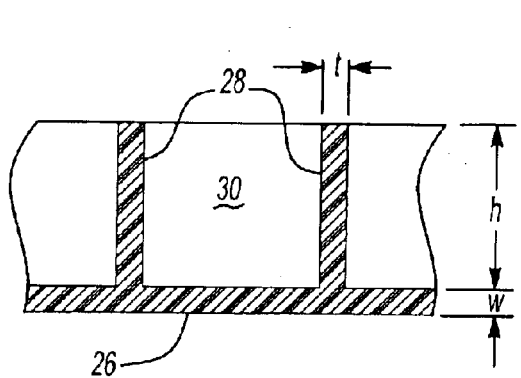
FIG. 3A is a cross-sectional view along line 3—3 as shown in FIG. 2.

FIG. 3A is a cross-sectional view along line 3—3. As shown, the base has a width w while the ribs 28 and 30 have a height h. Further, the ribs have a thickness t. While the ribs have been shown to have a uniform height and uniform thickness, it is of course within the scope of this invention to vary these dimensions locally to achieve a particular design function.

In preferred embodiments of this invention, the height of the ribs 28 and 30 is relatively great when compared to the thickness w of the base 26, or the thickness t of the ribs 28 and 30. Notably, the thickness of the base in one application was 3 mm, with the thickness of the rib t being 2 mm and the height of the rib being 6 mm. Other example dimensions are shown in a table as set forth at FIG. 3B.

Notably, the second plate 24 has a thickness that is preferably less than the thickness of the base 26 of plate 22. Again, the dimensions are exemplary, and the invention would extend beyond any particular dimension. However, note that in the preferred dimensions shown in FIG. 3B, the thickness w of base 26 is less than the height h of ribs 28 or 30. In fact, in all of the examples, the height of the ribs is at least twice as much as the thickness w. As to the thickness h of the ribs 28 and 30, in the preferred dimensions, the height of the rib h is at least three times the thickness w. Further, it is notable that the thickness of the second plate 24 is less than the thickness w of the base 26.

Figure 4:
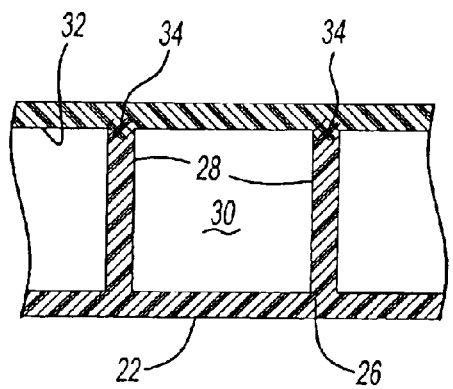
FIG. 4 shows the inventive molded plastic part with the two plates welded together.

As shown in FIG. 4, the plate 22 is welded along surfaces 32 and 34 to the plate 24. The ribs 28 and 30 thus contact and provide stiffness to the combined part.

While the illustration shows an air intake manifold, other plastic parts for an air induction system for a vehicle engine may benefit from this invention. As an example, intake resonators, air cleaners, etc. Also, other vehicle components such as HVAC plenums, valve covers, etc. may utilize this invention. Further, various methods of joining the two plates can be utilized such as plastic welding, vibration, ultrasonic, or hot plate welding.

Although preferred embodiments of this invention have been disclosed, a worker of ordinary skill in the art would recognize that certain modifications would come within the scope of this invention. For that reason, the following claims should be studied to determine the true scope and content of this invention.

What is claimed is:

1. A molded plastic part being formed of two spaced plates comprising:

a first plate having a base with a plurality of ribs extending from said base in a first direction; and a second plate spaced from said first place in said first direction, said ribs being secured to said second plate to form a molded plastic part, at least a portion of said molded plastic part having a curved contour said molded plastic part being an air induction part for a vehicle engine.

2. A molded plastic part as set forth in claim 1, wherein said ribs are formed to extend along at least two directions on said base.

3. A molded plastic part as set forth in claim 2, wherein said ribs are formed in generally perpendicularly aligned sets such that the overall configuration of said ribs is a honeycomb shape.

4. A molded plastic part as forth in claim 1, wherein a width of said base measured along said first direction is less than a height of said plurality of ribs also measured along said first direction.

5. A molded plastic part as set forth in claim 4, wherein a thickness of said ribs, measured perpendicular to said first direction, is less than said height of said ribs.

6. A molded plastic part as set forth in claim 5, wherein said thickness of said ribs is less than one-third of said height of said ribs.

7. A molded plastic part as set forth in claim 4, wherein said width of said base is less than half said height of said ribs.

8. A molded plastic part as set forth in claim 4, wherein a width of said second plate is less than said width of said base.

9. A molded part to be utilized in an automobile comprising:

a first plate having a base with a plurality of ribs extending from said base in a first direction;

a second plate spaced from said first plate in said first direction, said ribs being secured to said second plate to form a molded plastic part, said ribs formed to extend along at least two directions on said base plate, and in generally perpendicularly aligned sets such that the overall configuration of said ribs is a honeycomb shape, and a width of said base is less than a height of said plurality of ribs, with both said width and said height measured along said first direction and;

said molded plastic part is an air induction part for a vehicle engine.

10. A molded plastic part being formed of two spaced plates comprising:

a first plate having a base with a plurality of ribs extending from said base in a first direction;

a second plate spaced from said first plate in said first direction, said ribs being secured to said second plate to form a molded plastic part; and said molded plastic part being an air induction part for a vehicle engine.

* * * * *